March 6, 1928.

C. L. MICHOD 1,661,439

METHOD AND APPARATUS FOR LOADING AND SUPPORTING VEHICLE BODIES IN FREIGHT CARS AND THE LIKE

Filed Jan. 22, 1926

Inventor:
Charles L. Michod
By Rector, Hibben, Davis and Macauley
Attys

March 6, 1928.

C. L. MICHOD 1,661,439

METHOD AND APPARATUS FOR LOADING AND SUPPORTING VEHICLE BODIES IN FREIGHT CARS AND THE LIKE

Filed Jan. 22, 1926

Inventor;
Charles L. Michod
By Rector, Hibben, Davis and Macauley
Attys

Patented Mar. 6, 1928.

1,661,439

UNITED STATES PATENT OFFICE.

CHARLES L. MICHOD, OF CHICAGO, ILLINOIS, ASSIGNOR, BY DIRECT AND MESNE ASSIGNMENTS, TO THE STUDEBAKER CORPORATION, OF SOUTH BEND, INDIANA, A CORPORATION OF NEW JERSEY, AND THE COPONY AUTO LOADING COMPANY, OF DETROIT, MICHIGAN, A CORPORATION OF MICHIGAN.

METHOD AND APPARATUS FOR LOADING AND SUPPORTING VEHICLE BODIES IN FREIGHT CARS AND THE LIKE.

Application filed January 22, 1926. Serial No. 82,913.

This invention relates to the loading and shipping of vehicle bodies and the like in freight cars, boats and other transportation means, and has to do particularly with improvements in method and apparatus for loading and supporting such vehicle bodies for transportation or storage.

One of the main objects of my invention is to provide for loading and supporting vehicle bodies in superimposed position in freight cars and the like whereby a large number of bodies may be shipped in a single freight car, and may be placed therein and removed therefrom with relative care and speed.

Another object is to provide means for so loading, installing and supporting such vehicle bodies that the bodies may be removably secured to suitable support members and then moved as a unit with the support members to such a position that the ends of the latter are secured to and supported by bracket members secured to the sides of the freight car and the like.

Other objects of my invention are to construct the supporting apparatus so that it is economical to manufacture, simple in construction and readily assembled and disassembled; to make the apparatus adjustable to be adapted to freight cars or shipping compartments of different widths and to accommodate vehicle bodies of various widths; and to make the apparatus collapsible or foldable, without requiring disassembly of the parts, so it can be easily shipped or stored as a unit, when not in use.

With the above and incidental objects in view the invention consists in certain novel features of construction and combination of parts, essential elements of which are recited in the appended claims and a preferred form of embodiment of which is described in detail hereinafter and illustrated in the accompanying drawings wherein,—

This application is a continuation of my application Serial No. 754,483, filed December 8, 1924, for means for supporting vehicle bodies during shipment as to all matter common to the two applications.

Figure 1:
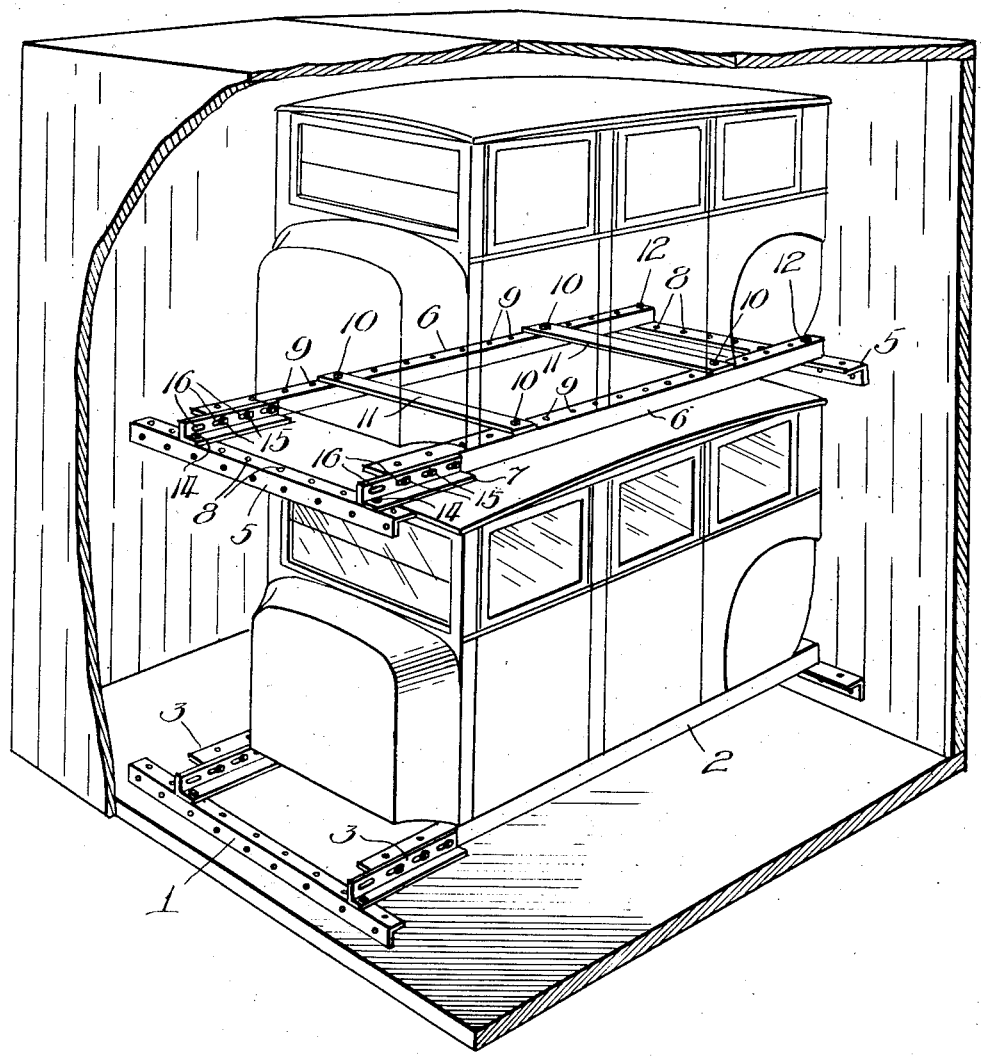
Figure 1 is a perspective view showing the interior of an end portion of a freight car with apparatuses embodying my invention mounted therein for the purpose of carrying the upper vehicle body above the lower vehicle body, the freight car and the bodies being illustrated more or less diagrammatically.
Figure 2:
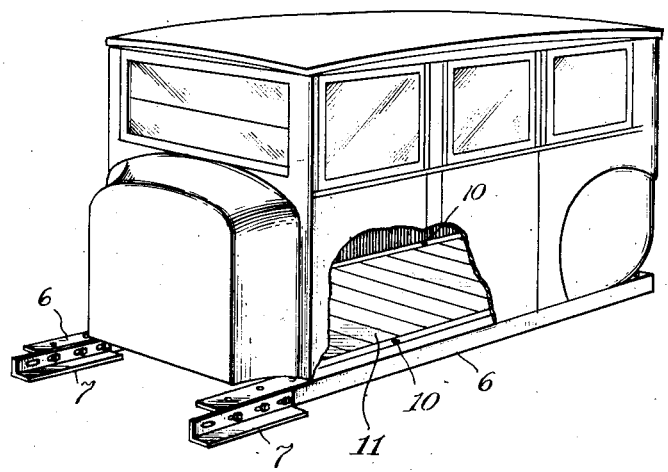
Fig. 2 is a perspective view of a vehicle body, such as that shown in Fig. 1, connected to its supporting members and ready to be moved to a position in the freight car wherein the ends of the supporting members will rest upon the bracket members as shown in Fig. 1.

Referring to the drawings, the automobile bodies are loaded in the freight car in superimposed position. The lower tier of bodies may be secured directly to the floor of the freight car, if desired; or they may be mounted on supporting apparatus embodying my invention, as shown in Fig. 1. The bodies of the upper tier are loaded and supported in accordance with my invention. There is one of my supporting devices for each body of such upper tier. The supporting apparatus for each of these upper tier bodies may comprise end or bracket members 5, side or supporting members 6 connected at their rear ends (as in Fig. 1) to one of the bracket members 5 and at their front ends to members 7 which, in turn, have their front ends connected to the front bracket member 5. The members 5, 6 and 7 are preferably, though not necessarily, formed of angle irons, as shown in the drawings. The depending webs or flanges of the angle iron brackets 5 are provided with a plurality of holes through which nails are driven, or other desired fastening means are applied, to secure them to the sides of the freight car at the desired height, such height being determined by the height of the body of the lower tier directly beneath. The lateral or horizontal flanges of these brackets 5 are provided with a plurality of bolt holes 8, and the lateral or horizontal flanges of the supporting members 6 are likewise provided with bolt holes 9. The vehicle body rests upon and is adapted to be carried by these horizontal flanges of the supporting members 6, and is rigidly secured thereto by means of bolts 10 which project through holes in the floor members 11 of the body and the registering bolt holes 9, there being a large number of bolt holes 9 so that different lengths of bodies with different positioned bolt holes in their floors may be accommodated. The bolts 10 may project through holes in the side sills of the floor of the body as illustrated in Fig. 2 or through the cross sills or other parts of the floor, as desired.

With the supporting members 6 secured to the floor or sills of the body, such unit is held fixed in place upon the brackets 5 by bolts 12 which project through the rear bolt holes 9 and through bolt holes 8 in the horizontal flange of the rear bracket 5. If found desirable, any well known means such as the collar, washer or the like may be carried by the bolt 12 between the horizontal flanges of the members 5 and 6 to prevent the possibility of tipping of the members 6; however, tipping is not likely to occur in view of the connection of the horizontal flanges of the members 6 to the body in the manner stated. The forward ends of the angle irons 7 rest on the horizontal flange of the forward bracket 5 and are adapted to be secured in position thereon by means of bolts 14 extending through holes in the horizontal flanges of the members 7 and 5. The forward ends of the vertical flanges of the supporting members 6 are provided with a plurality of bolts or headed pins 15, preferably three in number, and these bolts project through elongated slots 16, which may be key-hole shaped for the purposes of assembly if desired, formed in the vertical flanges of the angle iron 7.

It will be noted that there are a number of holes 8 in the horizontal flanges of the brackets 5 so that the distance between the supporting or cross members 6 may be varied as desired to accommodate bodies of different widths, and the angle irons 7 are adapted to be moved longitudinally relative to the members 6, by the bolt-and-slot connections 15—16 to accommodate freight cars of different widths. It will also be observed that, when the apparatus is not in use, as when the body has reached its destination and has been removed from the supporting members 6, the provision for pivotal connection between the members 5, 6 and 7 permits the entire apparatus to be folded into a compact mass so that it is more easily stored or returned to the body shipper.

The bodies of the lower tier may be supported in a manner similar to the bodies in the upper tier. In this instance the brackets 1, which correspond to the brackets 5, may be secured to the sides of the car, at the bottom; and the body with the attached supporting members 2, which correspond to the supporting members 6, may be moved as a unit into the freight car so that the ends of the supporting members 2 rest upon the brackets 1 in the same manner as in connection with the body of the upper tier. The supporting members of the body of the lower tier are provided with angle iron members 3, similar to and for the same purpose as the angle iron members 7. In fact the supporting apparatus for the body of the lower tier may be identical with that for the body of the upper tier, the only difference being the relative vertical positions of the brackets 1 and 5. However, in connection with the body of the lower tier, if desired, the vertical flanges of the brackets 1 which are secured to the freight car sides may not be of as great width as the corresponding flanges of the brackets 5 so as to carry the body closer to the freight car floor and thus conserve space.

In applying my invention to the loading, installing and supporting of vehicle bodies in superimposed position in freight cars and the like, I mount the separate front and rear brackets 5 on the interior side walls of the freight car at the proper height directly opposite each other. If the freight car is regularly used by the automobile body manufacturer for the transportation of vehicle bodies, the brackets 5 may be unremovably secured in position therein, if desired, and even when detachably secured need not be removed at any time. The supporting cross members 6 are applied to the bottom of the vehicle body and securely fastened thereto by the bolts 10, as above described and as shown in Fig. 2. In practice, the body with the supporting members 6 attached as in Fig. 2, is positioned on the platform of a movable hoist or elevator and the hoist is rolled or otherwise moved into the freight car. The platform is first raised so that the support members 6 are higher than the brackets 5, and the hoist is then moved to bring the members 6 and 7 over the brackets, and finally the platform is lowered, leaving the body supported on the brackets through the members 6 and 7. The ends of the supporting members 6 and 7 are then properly aligned with the holes 8 in the respective brackets 5 and the bolts 12 and 14, respectively, inserted and secured as hereinbefore explained. It is to be understood that, during the foregoing loading operations, the slot-and-pin arrangement 15—16 permits the members 7 to be adjusted longitudinally of the members 6 to bring their ends properly over the bracket 5. To unload the bodies it is apparent that the foregoing operations are reversed.

Figure 3:
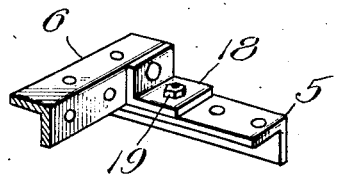
Fig. 3 is a detailed perspective view showing a modified form of connection between certain parts of my device, which will be described more fully hereinafter.

In Fig. 3 I have shown a modified form of connection between the rear ends of the angle iron supporting members 6 and the rear bracket 5, the connection in this instance consisting of a bracket member 18 riveted to the member 6 and pivoted by a bolt 19 to the horizontal flange of the rear bracket 5.

I claim:

1. An apparatus for supporting vehicle bodies in a freight car or the like comprising bracket members arranged for aligned attachment to the opposite walls of the freight car body, supporting members extending crosswise of said freight car body and adjustably engaging said bracket members, means for removably securing said cross members and brackets together in adjusted position, and means for attaching and securing the vehicle body to said cross members.

2. An apparatus for supporting vehicle bodies in a freight car or the like comprising bracket members arranged for aligned attachment to the opposite walls of the freight car body, and members detachably carried by the vehicle body for engaging said bracket members to support the body in the freight car, and means for removably securing said bracket members and body unit in place together.

3. In an apparatus for supporting vehicle bodies in a freight car or the like, bracket members adapted to be located in horizontal alignment on the opposite side walls of the freight car, said members having horizontal shelf sections with openings therein, and members removably carried by the vehicle body and adapted to extend crosswise of the freight car to engage said horizontal shelf sections, said last named members having openings therein adapted to align with the openings in said bracket member shelves for removably securing the same together.

4. The method of loading objects in freight cars, comprising first securing to each of said objects a plurality of quickly detachable cross-members, placing each of said objects and its corresponding cross-members in said car as a unit, and thereafter securing said cross-members to the sides of the car and out of contact with the floor of the latter.

5. The method of loading an object in a freight car for shipment, comprising first securing to said object a quickly detachable supporting part, placing said object and said supporting part in said freight car as a unit, and thereafter securing said supporting part to the sides of said car with said object out of contact with said car.

6. The method of loading objects in freight cars, comprising securing brackets to the sides of said cars, securing cross-members on each of said objects, and placing each of said objects with its respective cross-members in said car as a unit with said cross-members supported by said brackets and spanning the interior width of said car and thereafter securing said cross-members to said brackets.

7. The method of loading an automobile body in a freight car for shipment, comprising securing supporting cross-members to said body, placing said body and said cross-members in said car as a unit, and removably securing said cross-members to said car.

8. The method of loading an automobile body in a freight car for shipment, comprising securing brackets to the side of said car above the level of the floor thereof, securing supporting cross-members to said body, placing said body and said cross-members in said car as a unit with the ends of said cross-members supported on said brackets and said cross-members spanning the interior width of said car and thereafter securing said cross-members to said brackets.

9. Means for supporting an automobile body in a freight car comprising brackets secured to the sides of said freight car, cross-members supporting said body spanning the width of said car and secured to said brackets, and means for securing said cross-members to said automobile body whereby said body and cross-members can be removed from said car as a unit.

10. In an apparatus for supporting a vehicle body in freight cars and the like, the combination of end supporting members adapted to be secured to the walls of the freight car, and adjustable side members secured to said end members to accommodate vehicle bodies of different widths and adapted to have the vehicle body secured thereto, said end members extending transversely of the supported vehicle body, and said side members extending longitudinally of said vehicle body.

11. In an apparatus for supporting a vehicle body in freight cars or the like, the combination of end members adapted to be secured to the walls of the freight car, adjustable side members for accommodating freight cars of different widths secured at their ends to said supporting end members and adapted to have the vehicle body secured thereto, said end members extending transversely of the vehicle body and said side members extending longitudinally of said vehicle body.

12. In an apparatus for supporting a vehicle body in freight cars and the like, the combination of end members adapted to be secured to walls, side members adjustable lengthwise in themselves and adapted to be adjustably connected different distances apart to said end members to be adapted to freight cars and to accommodate vehicle bodies of different widths, and means for securing the vehicle body to said side members.

13. In an apparatus for supporting a vehicle body in freight cars and the like, the combination of end members having a plurality of bolt holes, side members each comprising two pieces adjustable lengthwise, means for adjustably connecting the ends of the side members to the end members to accommodate vehicle bodies of different widths, and means for securing the vehicle body to said side members.

14. In an apparatus for supporting a vehicle body in a freight car or the like, the combination of end members adapted to be secured to walls, side members each comprising two pieces adjustably connected together by slot-and-pin connections, means for pivotally connecting the side members to said end members, and means for securing the vehicle body to the side members.

15. In an apparatus for supporting a vehicle body in a freight car or the like, the combination of end members comprising angle irons adapted to be secured to walls and having one flange provided with a plurality of bolt holes, side members comprising angle irons the horizontal flanges of which are provided with a plurality of bolt holes so that bodies with differently arranged bolt holes in the floor thereof may be secured by bolts to said flanges, bolts projecting through the selected bolt holes in the horizontal flange of the rear end angle iron and through bolt holes in the rear ends of said side angle irons to pivot the parts together, front angle irons having slot-and-pin connections with the side angle irons to accommodate freight cars of different widths, and bolts projecting through the selected holes of the horizontal flange of the front end angle iron and through holes in said front angle irons to pivot the parts together.

16. In an apparatus for supporting a vehicle body in a freight car or the like, the combination of end angle irons adapted to be secured to the walls of the car, side angle irons adjustable lengthwise to accommodate freight cars of different widths, and having a plurality of bolt holes in their horizontal flanges to accommodate vehicle bodies having differently arranged bolt holes in the floor thereof, and bolts adapted to project through said bolt holes to secure the vehicle body to said side angle irons.

17. In an apparatus for supporting vehicle bodies and the like in freight cars, in vertical superimposed position, comprising a supporting structure having side members extending longitudinally with respect to said vehicle body, end members extending transversely with respect to said vehicle body, means for securing said supporting structure within said freight car, said side members being provided with portions upon which the supported vehicle is adapted to directly rest, and adjustable means for securing the supported vehicle structure to said side bars.

18. The method of loading an automobile body in a freight car or the like for shipment, comprising first securing to said body a removable supporting part adapted to lie transversely of the freight car interior, placing said body and its supporting part in said freight car as a unit in an upright condition, and thereafter securing said supporting part to the sides of the freight car interior with said body out of contact with said car.

19. The method of loading automobile bodies in freight cars, comprising securing brackets to the opposite interior side walls of the freight car, securing supporting members on each of said bodies, and placing each of said bodies with its respective supporting members in said car as a unit in an upright condition with said supporting members carried by said brackets and spanning the interior width of the freight car, and thereafter securing the supporting members to said brackets.

20. An apparatus for supporting vehicle bodies in freight cars comprising a complete supporting structure having its members in the form of a closed angular figure the sides of which are extensible longitudinally and transversely.

In testimony whereof, I have subscribed my name.

CHARLES L. MICHOD.